Patented Aug. 11, 1942

2,292,464

UNITED STATES PATENT OFFICE 2,292,464

N-HYDROXYALKYL N-ARYL SULPHONAMIDES AND THEIR DERIVATIVES

William Henry Moss, London, England, assignor to Celanese Corporation of America, a corporation of Delaware No Drawing. Application May 8, 1940, Serial No. 333,937. In Great Britain May 23, 1939

7 Claims. (Cl. 106—186)

This invention relates to a new class of chemical compounds, viz. N-hydroxyalkyl N-aryl sulphonamides and their derivatives, for example their esters and ethers.

The new compounds are valuable plasticisers for cellulose acetate and other organic, film-forming thermoplastic substances, the molecules of which contain recurring oxygen-containing groups. Examples of the oxygen-containing groups which may recur in the molecules of the thermoplastic substance are ether groups, ester groups and amide groups. The thermoplastic substances which can be plasticised by the new compounds of the invention include, in addition to cellulose acetate, other organic esters of cellulose, e. g. cellulose propionate, cellulose butyrate, cellulose acetate-propionate, cellulose acetate-butyrate and cellulose acetate-nitrate; cellulose ethers, e. g. ethyl and benzyl celluloses; ether-esters of cellulose, e. g. ethyl cellulose acetate; polyvinyl compounds especially polyvinyl esters, ethers and ether-esters, e. g. polyvinyl acetate, the acetals of polyvinyl alcohol and of partly saponified polyvinyl acetate with lower aliphatic aldehydes; polymerised esters of acrylic acid, e. g. polymethyl methacrylate; co-polymers of polymerised oxygen-containing vinyl compounds (including acrylic acid and its esters) e. g. co-polymers of vinyl acetate and vinyl chloride; film-forming thermoplastic proteins such as casein and soya bean casein; synthetic thermoplastic film-forming substances of protein-like character, e. g. condensation products of high molecular weight of diamines with dicarboxylic acids or disulphonic acids; synthetic resins formed by condensation of (a) di- and poly-hydric alcohols (including di-hydroxyalkyl aryl sulphonamides for example, di-hydroxyethyl toluene sulphonamide) with di-carboxylic acids, especially phthalic acid, (b) poly-nuclear phenols, e. g. diphenylol propane, with aldehydes, especially formaldehyde, or (c) aryl sulphonamides with aldehydes, e. g. formaldehyde, and/or with dichlorhydrins, e. g. symmetrical dichlorhydrin.

According to the process of the invention, the N-hydroxyalkyl N-aryl sulphonamides are made by reacting upon an N-mono-aryl-sulphonyl derivative of a primary aromatic amine, e. g. p-toluene sulphonanilide, with an hydroxyalkylating agent, e. g. an alkylene oxide or a chlorhydrin.

Among the sulphonyl derivatives of primary aromatic amines which can be hydroxyalkylated according to the invention are: the benzyl sulphonyl-, o- and p-toluene sulphonyl-, and the o- and p-ethyl phenyl sulphonyl-derivatives of aniline, of the toluidines, or of the benzylamines. The sulphonyl derivatives may be unsubstituted or alkyl-substituted in either or both of the nuclei. Other nuclear substituents may be present, for instance halogens, especially chlorine, ether groups, e. g. methoxy or ethoxy groups, and acidyl-oxy groups, e. g. acetyl-oxy or propionyl-oxy groups. The hydroxyalkylating agents which can be employed include ethylene oxide, propylene oxide, the butylene oxides, epichlorhydrin, ethylene chlorhydrin and symmetrical glycerol chlorhydrin.

By esterification of the hydroxy group of the N-hydroxy-alkyl N-aryl sulphonamides of the invention, e. g. with acetylating agents or phthalating agents, a further series of new compounds useful as plasticisers for substances of the kind plasticised by the N-hydroxyalkyl, N-aryl sulphonamides, can be made.

The following examples, in which all the parts are by weight, illustrate the invention:

Example 1

This example illustrates the production of N-hydroxyethyl N-phenyl p-toluene sulphonamide.

A solution is made of the following composition:

| | Parts |
|---|---|
| p-Toluene sulphonanilide | 247 |
| Water | 1,440 |
| Caustic soda | 428 |

Ethylene oxide is passed gradually into this solution maintained at about 80° C. under reflux over a period of about 3 hours till a weight increase of 55 parts is obtained. The product appears as a white oil which is separated from the dilute caustic soda solution, neutralised, washed and fused at 140° C. to remove water.

It crystallises, on standing, in fine white needles which can be recrystallised from hot water and melt at 51–53° C. The same product can be obtained using ethylene chlorhydrin instead of ethylene oxide.

Example 2

This example illustrates the production of N-acetyl - hydroxyethyl N - phenyl p - toluene sulphonamide.

269 parts of the product of Example 1 and 60 parts of acetic anhydride are heated together for one hour under reflux. The excess of acetic acid and anhydride are then distilled off, and the product is washed with water several times and fused at 140° C. to remove water. It then appears as a thick clear pale yellow oil.

In the remaining examples, which illustrate compositions of matter containing the plasticisers of the invention, the word "plasticiser" denotes either the product of Example 1 or the acetyl derivative thereof obtained according to Example 2. Either of these plasticisers can be employed in all the compositions specified.

Example 3

A solution for coating a fabric or braid to give a flexible but fairly hard coating, has the following composition:

| | Parts |
|---|---|
| Cellulose acetate | 100 |
| Plasticiser | 100 |
| Acetone | 800 |

Example 4

A solution suitable for application to braided cable or for coating fabrics to give a soft, very flexible, glossy, coating, has the following composition:

| | Parts |
|---|---|
| Cellulose acetate | 100 |
| Plasticiser | 200 |
| Acetone | 400 |
| Alcohol | 170 |
| Benzene | 220 |

Example 5

A solution suitable for flowing on to glass, metal or other suitable casting surface, for the production of transparent wrapping paper, films or sheets; or for producing transparent containers by a dipping process, has the following composition:

| | Parts |
|---|---|
| Cellulose acetate | 100 |
| Plasticiser | 25 |
| Acetone | 400 |

Example 6

A moulding powder is made by working together 2 parts of cellulose acetate with 1 part of plasticiser to form a homogenous mixture. The working may be effected on rolls in the absence of a liquid medium or may be effected with the aid of water or of alcohol, these media being subsequently evaporated off.

Colouring agents, for example, 1–5 parts of a suitable dye may be incorporated in any of the compositions of Examples 3–5. Fillers or pigments may also be incorporated in the compositions of Examples 3 or 4, for instance, to the extent of 1–100 parts. The composition of Example 6 may also contain dyestuffs, for example, in proportion between 1 and 5% on the weight of the cellulose acetate, or fillers or pigments, to the extent of 1–100% on the weight of the cellulose acetate.

Example 7

A liquid adapted to give a flexible opaque matt finish to fabrics, has the following composition:

| | Parts |
|---|---|
| Cellulose acetate | 100 |
| Plasticiser | 100 |
| Dye | 10 |
| Pigment | 60 |
| Filler | 60 |
| Acetone | 400 |
| Alcohol | 170 |
| Benzene | 220 |
| Diacetone alcohol | 100 |

Example 8

A solution suitable for coating metallic surfaces:

| | Parts |
|---|---|
| Cellulose acetate | 100 |
| Plasticiser | 60 |
| Synthetic resin | 120 |
| Titanium dioxide | 50 |
| Ethyl acetate | 240 |
| Methyl ethyl ketone | 240 |
| Acetone | 240 |
| Toluene | 80 |
| Ethyl lactate | 200 |

The synthetic resin employed is obtained by the condensation of phthalic anhydride with diethoxy toluene sulphonamide.

Example 9

A solution suitable for the same purpose as that of Example 8 has the same composition as that of Example 8, save that the synthetic resin employed is obtained by the condensation of diphenylol propane with formaldehyde.

Having described my invention, what I desire to secure by Letters Patent is:

1. A composition of matter containing an organic film-forming thermoplastic substance, the molecules of which contain recurring oxygen-containing groups, said substance being plasticised with the aid of an N-hydroxyalkyl N-aryl aryl sulphonamide.

2. A composition of matter containing an organic film-forming thermoplastic substance, the molecules of which contain recurring oxygen containing groups, said substance being plasticised with the aid of N-hydroxyethyl N-phenyl p-toluene sulphonamide.

3. A composition of matter containing a cellulose ether plasticized with the aid of N-hydroxyethyl N-phenyl p-toluene sulphonamide.

4. A composition of matter containing an organic ester of cellulose plasticized with the aid of N-hydroxyethyl N-phenyl p-toluene sulphonamide.

5. A composition of matter containing an organic film-forming thermoplastic substance, the molecules of which contain recurring amide groups, said substance being plasticized with the aid of N-hydroxyethyl N-phenyl p-toluene sulphonamide.

6. A composition of matter containing cellulose acetate, said substance being plasticized with the aid of N-hydroxyethyl N-phenyl p-toluene sulphonamide.

7. A composition of matter containing the synthetic resinous esterification product of phthalic anhydride with di-hydroxyethyl toluene sulphonamide, said substance being plasticized with the aid of N-hydroxyethyl N-phenyl p-toluene sulphonamide.

WILLIAM HENRY MOSS.